3,229,895
MEANS OF LOADING AND CONTROLLING RECIPROCATING EXPANSION ENGINES
Irving P. West, Mountainside, and William T. Alderson, Brookside, N.J., assignors to Ingersoll-Rand Company, New York, N.Y., a corporation of New Jersey
Filed Sept. 29, 1964, Ser. No. 400,181
9 Claims. (Cl. 230—2)

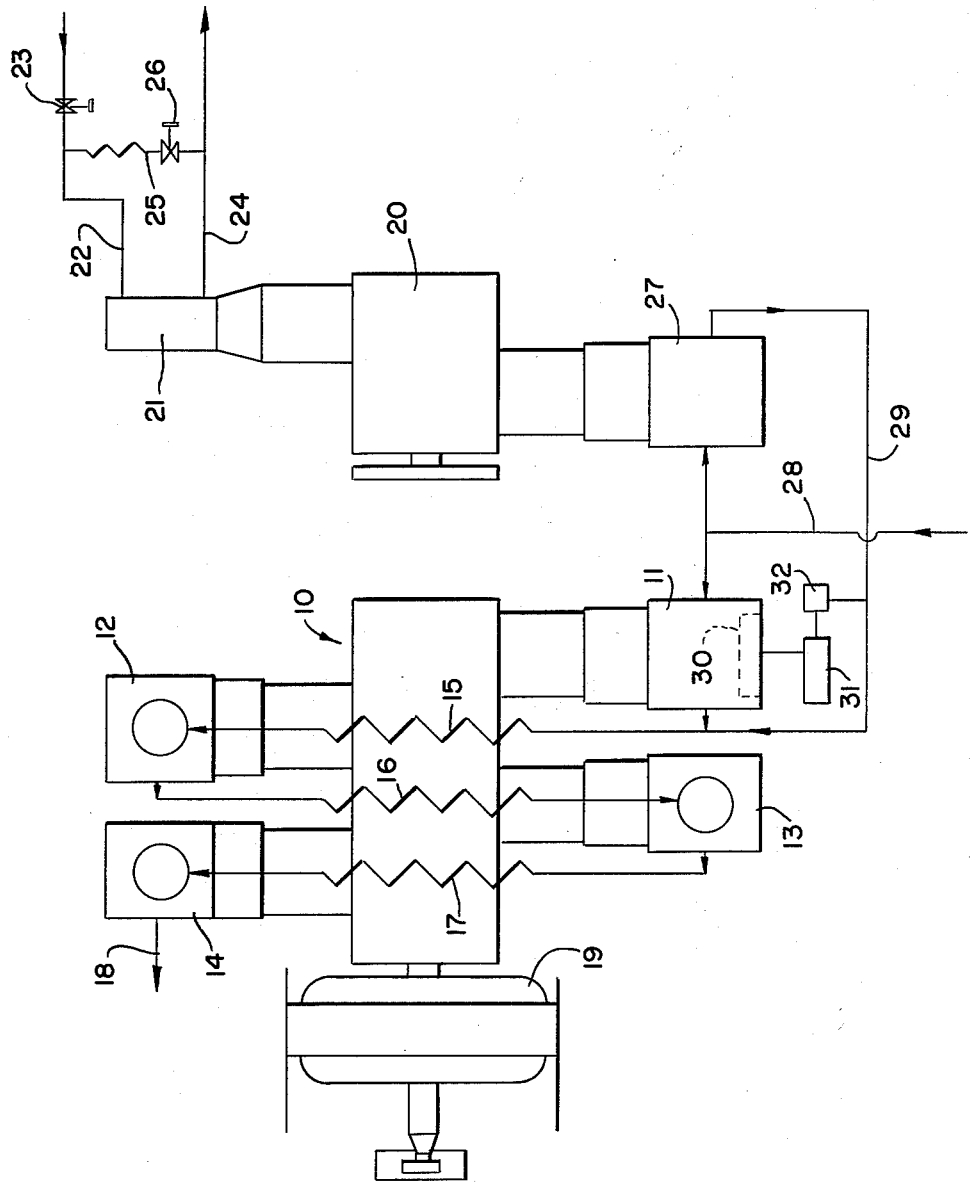
INVENTORS
WILLIAM T. ALDERSON
IRVING P. WEST
BY Charles J. Worth
AGENT

United States Patent Office 3,229,895
Patented Jan. 18, 1966

This invention relates generally to compressed gas systems and more particularly to such systems having waste power recovery means.

The use of expansion engines for waste power recovery in compressed gas systems is not new. However, heretofore, such engines have had a constant speed and were controlled by varying cut-off of motive gas. Such arrangements are inefficient since the engines are operating with incomplete expansion and are not loaded to utilize total maximum waste power available. Further, the numerous parts and complications of control devices for adjusting cut-off have proven to be costly, to require substantial maintenance, and to be significant in reducing the overall efficiency of the system.

Accordingly, an object of the present invention is to provide an expansion engine with constant torque, variable load requirements for waste power recovery for a compressed gas system.

Another object of the present invention is to provide the foregoing in which the engine operates at optimum efficiency.

And, another object of the present invention is to provide the foregoing in which the engine has a variable speed determined by its power input and is capable of utilizing total maximum waste power available.

Still another object of the present invention is to provide the foregoing in which the waste power recovery is realized in the power requirements to drive a compressor.

And still another object of the present invention is to interrelate an expansion engine for waste power recovery with a compressor to derive reduced power requirements for driving the compressor.

The present invention contemplates a constant speed prime mover, a compressor connected to the prime mover providing a load on the prime mover when driven at a constant speed thereby, the compressor having an inlet to receive gas to be compressed and an outlet to discharge compressed gas, a constant torque expansion engine having an inlet to receive compressed gas to be expanded and an outlet for such expanded gas, the engine being driven by the expanding gas at a rate in accordance with the compressed gas provided thereto and having means for compressing gas when driven, the compressing means having an inlet to receive gas to be compressed and an outlet for such compressed gas that is connected to the compressor to combine the output of the compressing means with the gas compressed by the compressor to provide the discharge at the compressor outlet, the compressor having means for varying the capacity of gas compressed thereby in response to signals, and means connected to the compressing means outlet for sensing the output of the compressing means and providing signals in accordance with the sensed output, the sensing means being connected to the variable capacity control to provide signals thereto to vary the capacity of gas compressed by the compressor and provide a constant compressed gas output at the compressor outlet.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing 1 for illustration purposes only and is not to be construed as defining the limits of the invention.

The single drawing is a diagrammatic view of a multistage compressor with an expansion engine for recovering waste power in accordance with the present invention.

Referring now to the drawings, a prime mover or motor 19 is provided to drive a four stage compressor 10 at a constant speed to provide a constant flow of compressed gas at its outlet or discharge 18 to a system (not shown). The number of stages of compressor 10 is arbitrarily chosen for illustration purposes only, and is not to be construed as defining the limits of the present invention. The compressed gas discharge from compressor 10 is to be provided at a constant predetermined pressure and at a constant predetermined temperature.

The power requirements of the prime mover 19 is determined by its load or the output torque required to drive the compressor 10 at the required driving speed. Inasmuch as the operating speed of compressor 10 is to remain constant, the power requirements of the prime mover 19 will vary with the work required of compressor 10 to provide the predetermined output to the system (not shown).

Compressor 10 has compression cylinders 11, 12, 13 and 14 connected in series by a plurality of intercoolers 15, 16, and 17. Thus, gas received by compressor 10 is progressively compressed by the cylinders or stages 11–14, being heated by compression, and being alternately cooled by intercoolers 15, 16, and 17 between the stages of compression.

An expansion engine 20 includes an expansion cylinder 21 having an inlet 22 connected to the system (not shown) to receive compressed gas to be expanded and cooled by expansion, and an outlet 24 connected to the system for the expanded and cooled gas. A valve 23 is provided in inlet line 22 to control the flow of compressed gas to cylinder 21. A bypass line 25, from the inlet 22 to the outlet 24, with a valve 26 is also provided.

Engine 20 is arranged for constant torque/variable load operation, therefore, its speed varies with the power available from expansion or in accordance with the compressed gas provided to expansion chamber 21. To implement this engine 20 has a compression cylinder 27 adapted to receive gas, to be compressed, from an inlet or supply line 28 which is connected to and/or forms the inlet of cylinder 11 and supplies gas to be compressed by compressor 10. Cylinder 27 has an outlet or discharge line 29 that is connected with the outlet or discharge from cylinder 11 to the inlet of intercooler 15 as will be further discussed.

The first stage compression cylinder 11 of compressor 10 and compression cylinder 27 of engine 20 are designed for the same inlet and discharge conditions, except for capacity. Although during operation it is contemplated that cylinders 11 and 27 will jointly supply compressed gas to meet intake requirements of the second stage cylinder 12, cylinder 11 alone must be capable of meeting such a demand.

Toward this end, cylinder 11 is provided with a variable capacity control 30 having actuating means 31. Means 32 is connected to line 29 and actuating means 31 for sensing the output of cylinder 27 and for providing signals to the actuating means 31 in response to such sensed output to actuate the variable capacity control 30 to vary the output of cylinder 11 so the combined output of cylinders 11 and 27 remains constant and satisfies the inlet requirements of the second stage cylinder 12.

Thus, operating output requirements of the first stage cylinder 11 are the inlet requirements of the second stage cylinder 27. Engine 20 operates at optimum efficiency at all times to derive maximum power, by maximum expansion of compressed gas available to cylinder 21, for compression by cylinder 27.

It then follows that cylinders 11 and 27 operate in parallel with one another to form the first stage of compressor 10 with cylinder 11 providing the required output that is not available from cylinder 27. As the required output of cylinder 11 lessens from maximum, the lower the load of compressor 10 and the prime mover 19 becomes which results in lower power demands by prime mover 19. The power to realize such savings is derived by expansion in cylinder 21, connected in the system (not shown), of gas being prepared for use.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. In a compressed gas system:
   (a) a constant speed compressor having an inlet to receive gas to be compressed and a discharge to provide a constant flow of compressed gas at constant predetermined pressure and temperature,
   (b) a constant torque variable load expansion engine means having an inlet to receive waste compressed gas and an outlet for waste gas after it has expanded,
   (c) compression means driven by the expansion engine means having an inlet to receive gas to be compressed and a discharge connected to the compressor discharge to provide compressed gas to the compressed gas from the compressor to form the constant compressed gas flow,
   (d) the compressor having means for varying the capacity of gas it compresses, and
   (e) sensing means connected to the discharge of the compression means and to the capacity varying means for sensing flow of compressed gas from the compression means and for controlling the capacity varying means in response thereto.

2. In a compressed gas system:
   (a) a constant speed compressor having an inlet to receive gas to be compressed and a discharge to provide a constant flow of compressed gas at constant predetermined pressure and temperature,
   (b) a constant torque variable load expansion engine means having an inlet to receive waste compressed gas and an outlet for waste gas after it has expanded,
   (c) the inlet of the expansion engine means having valve means for controlling the flow of waste compressed gas therethrough,
   (d) compression means driven by the expansion engine means having an inlet to receive gas to be compressed and a discharge connected to the compressor discharge to provide compressed gas to the compressed gas from the compressor to form the constant compressed gas flow,
   (e) the compressor having means for varying the capacity of gas it compresses, and
   (f) sensing means connected to the discharge of the compression means and to the capacity varying means for sensing flow of compressed gas from the compression means and for controlling the capacity varying means in response thereto.

3. In a compressed gas system:
   (a) a constant speed compressor having an inlet to receive gas to be compressed and a discharge to provide a constant flow of compressed gas at constant predetermined pressure and temperature,
   (b) a constant torque variable load expansion engine means having an inlet to receive waste compressed gas and an outlet for waste gas after it has expanded,
   (c) a bypass line connecting the inlet of the expansion engine means to its discharge and having valve means for controlling bypass flow therethrough,
   (d) compression means driven by the expansion engine means having an inlet to receive gas to be compressed and a discharge connected to the compressor discharge to provide compressed gas to the compressed gas from the compressor to form the constant compressed gas flow,
   (e) the compressor having means for varying the capacity of gas it compresses, and
   (f) sensing means connected to the discharge of the compression means and to the capacity varying means for sensing flow of compressed gas from the compression means and for controlling the capacity varying means in response thereto.

4. In a compressed gas system:
   (a) a constant speed compressor having an inlet to receive gas to be compressed and a discharge to provide a constant flow of compressed gas at constant predetermined pressure and temperature,
   (b) the compressor having a plurality of stages connected in series wherein the first stage thereof receives gas from the inlet and the last stage provides constant flow of compressed gas to the discharge,
   (c) the first stage of the compressor having means for varying the capacity of gas it compresses,
   (d) a constant torque variable load expansion engine means having an inlet to receive waste compressed gas and an outlet for waste gas after it has expanded,
   (e) compression means driven by the expansion engine means and connected in parallel with the first stage of the compressor, and
   (f) sensing means connected to the compression means and to the capacity varying means for sensing flow of compressed gas from the compression means and for controlling the capacity varying means in response thereto.

5. In a compressed gas system:
   (a) a constant speed compressor having an inlet to receive gas to be compressed and a discharge to provide a constant flow of compressed gas at constant predetermined pressure and temperature,
   (b) the compressor having a plurality of stages connected in series wherein the first stage thereof receives gas from the inlet and the last stage provides constant flow of compressed gas to the discharge,
   (c) the first stage of the compressor having means for varying the capacity of gas it compresses,
   (d) a constant torque variable load expansion engine means having an inlet to receive waste compressed gas and an outlet for waste gas after it has expanded,
   (e) the inlet of the expansion engine means having valve means for controlling the flow of waste compressed gas therethrough,
   (f) compression means driven by the expansion engine means and connected in parallel with the first stage of the compressor, and
   (g) sensing means connected to the compression means and to the capacity varying means for sensing flow of compressed gas from the compression means and for controlling the capacity varying means in response thereto.

6. In a compressed gas system:
   (a) a constant speed compressor having an inlet to receive gas to be compressed and a discharge to provide a constant flow of compressed gas at constant predetermined pressure and temperature,
   (b) the compressor having a plurality of stages connected in series wherein the first stage thereof receives gas from the inlet and the last stage provides constant flow of compressed gas to the discharge, (c) the first stage of the compressor having means for varying the capacity of gas it compresses,
(d) a constant torque variable load expansion engine means having an inlet to receive waste compressed gas and an outlet for waste gas after it has expanded,
(e) a bypass line connecting the inlet of the expansion engine means to its discharge and having valve means for controlling bypass flow therethrough,
(f) compression means driven by the expansion engine means and connected in parallel with the first stage of the compressor, and
(g) sensing means connected to the compression means and to the capacity varying means for sensing flow of compressed gas from the compression means and for controlling the capacity varying means in response thereto.

7. In a compressed gas system:
(a) a constant speed compressor having a plurality of compression cylinders connected in series with one another an inlet connected to the first cylinder to receive gas to be compressed, and a discharge connected to the last cylinder to provide a constant flow of compressed gas at constant pressure and temperature,
(b) the first cylinder having means for varying the capacity of gas compressed therein,
(c) a constant torque engine having an expansion cylinder with an inlet to receive waste compressed gas for driving the engine as it expands and a discharge for the expanded waste gas,
(d) the engine having a cylinder connected in parallel with the first compression cylinder of the compressor for compressing gas and for discharging the compressed gas to the second cylinder of the compressor which varies with the flow of compressed gas to the expansion cylinder,
(e) means connected to the engine compression cylinder for sensing flow of compressed gas therefrom to the second cylinder of the compressor, and
(f) the sensing means being connected to the capacity varying means for varying the capacity of gas compressed by the first cylinder of the compressor in accordance with the discharge of compressed gas from the engine compression cylinder to provide a constant flow of compressed gas to the second compression cylinder of the compressor.

8. In a compressed gas system:
(a) a constant speed compressor having a plurality of compression cylinders connected in series with one another, an inlet connected to the first cylinder to receive gas to be compressed, and a discharge connected to the last cylinder to provide a constant flow of compressed gas at constant pressure and temperature,
(b) the first cylinder having means for varying the capacity of gas compressed therein,
(c) a constant torque engine having an expansion cylinder with an inlet to receive waste compressed gas for driving the engine as it expands and a discharge for the expanded waste gas,
(d) the inlet of the expansion cylinder having valve means for controlling flow of waste compressed gas therethrough,
(e) the engine having a cylinder connected in parallel with the first compression cylinder of the compressor for compressing gas for discharging the compressed gas to the second cylinder of the compressor which varies with the flow of compressed gas to the expansion cylinder,
(f) means connected to the engine compression cylinder for sensing flow of compressed gas therefrom to the second cylinder of the compressor, and
(g) the sensing means being connected to the capacity varying means for varying the capacity of gas compressed by the first cylinder of the compressor in accordance with the discharge of compressed gas from the engine compression cylinder to provide a constant flow of compressed gas to the second compression cylinder of the compressor.

9. In a compressed gas system:
(a) a constant speed compressor having a plurality of compression cylinders connected in series with one another, an inlet connected to the first cylinder to receive gas to be compressed, and a discharge connected to the last cylinder to provide a constant flow of compressed gas at constant pressure and temperature,
(b) the first cylinder having means for varying the capacity of gas compressed therein,
(c) a constant torque engine having an expansion cylinder with an inlet to receive waste compressed gas for driving the engine as it expands and a discharge for the expanded waste gas,
(d) a bypass line connecting the inlet of the expansion cylinder to the outlet thereof and having valve means for controlling the bypass flow therethrough,
(e) the engine having a cylinder connected in parallel with the first compression cylinder of the compressor for compressing gas and for discharging the compressed gas to the second cylinder of the compressor which varies with the flow of compressed gas to the expansion cylinder,
(f) means connected to the engine compression cylinder for sensing flow of compressed gas therefrom to the second cylinder of the compressor, and
(g) the sensing means being connected to the capacity varying means for varying the capacity of gas compressed by the first cylinder of the compressor in accordance with the discharge of compressed gas from the engine compression cylinder to provide a constant flow of compressed gas to the second compression cylinder of the compressor.

References Cited by the Examiner

UNITED STATES PATENTS

| | | | |
|---|---|---|---|
| 2,743,051 | 4/1956 | Grey | 230—116 |
| 2,849,173 | 8/1958 | Sendy | 230—116 |
| 2,914,242 | 11/1959 | Meienberg | 230—45 |
| 3,054,552 | 9/1962 | Doubleday et al. | 230—2 |
| 3,097,478 | 7/1963 | Luck | 230—19 |

SAMUEL LEVINE, *Primary Examiner.*

W. L. FREEH, *Assistant Examiner.*